US010494219B2

(12) United States Patent
Nadeau et al.

(10) Patent No.: US 10,494,219 B2
(45) Date of Patent: Dec. 3, 2019

(54) FILAMENT LOADING DRIVE IN A 3D PRINTER

(71) Applicant: Stratasys, Inc., Eden Prairie, MN (US)

(72) Inventors: Jordan Paul Nadeau, St. Louis Park, MN (US); Peter D. Schuller, Elko, MN (US); Shawn Michael Koop, Blaine, MN (US); Logan R. Kiene, Minneapolis, MN (US)

(73) Assignee: STRATASYS, INC., Eden Prairie, MN (US)

( * ) Notice: Subject to any disclaimer, the term of this patent is extended or adjusted under 35 U.S.C. 154(b) by 387 days.

(21) Appl. No.: 15/237,161

(22) Filed: Aug. 15, 2016

(65) Prior Publication Data

US 2018/0043628 A1 Feb. 15, 2018

(51) Int. Cl.
*B33Y 30/00* (2015.01)
*B65H 51/10* (2006.01)
*B33Y 40/00* (2015.01)
*B65H 51/32* (2006.01)
*B29C 64/209* (2017.01)
*B29C 64/321* (2017.01)
*B29C 64/118* (2017.01)

(52) U.S. Cl.
CPC ............ *B65H 51/10* (2013.01); *B29C 64/118* (2017.08); *B29C 64/209* (2017.08); *B29C 64/321* (2017.08); *B33Y 30/00* (2014.12); *B33Y 40/00* (2014.12); *B65H 51/32* (2013.01)

(58) Field of Classification Search
CPC .......... B65H 51/10; B33Y 30/00; B33Y 40/00
See application file for complete search history.

(56) References Cited

U.S. PATENT DOCUMENTS

| 4,461,416 | A | * | 7/1984 | Cheh ..................... B65H 51/10 226/1 |
| 6,004,124 | A | | 12/1999 | Swanson et al. |
| 6,722,872 | B1 | | 4/2004 | Swanson et al. |
| 7,063,285 | B1 | | 6/2006 | Turley et al. |
| 7,127,309 | B2 | | 10/2006 | Dunn et al. |
| 7,604,470 | B2 | | 10/2009 | LaBossiere et al. |
| 7,625,200 | B2 | | 12/2009 | Leavitt |

(Continued)

FOREIGN PATENT DOCUMENTS

WO 2016014543 A1 1/2016

*Primary Examiner* — Jacob T Minskey
*Assistant Examiner* — Melody Tsui
(74) *Attorney, Agent, or Firm* — Westman, Champlin & Koehler, P.A.

(57) ABSTRACT

A 3D printer includes at least one consumable loading bay configured to supply filament from a consumable supply assembly to a print head and at least one drive assembly that is configured to advance filament to the print head from the consumable supply. Each drive assembly includes a follower wheel rotatable about a follower axis and a drive wheel spaced apart from the follower wheel. The drive wheel is rotatable about a drive axis and is located on an opposing side of a filament path from the follower wheel such that the follower axis and the drive axis are substantially parallel. The drive wheel further includes an outer surface extending between two ends and has at least one engaging portion that is configured to engage with the filament and at least one disengaging portion that is configured to disengage from the filament.

12 Claims, 4 Drawing Sheets

(56) References Cited

U.S. PATENT DOCUMENTS

| | | |
|---|---|---|
| 7,938,356 B2 | 5/2011 | Taatjes et al. |
| 8,403,658 B2 | 3/2013 | Swanson |
| 8,439,665 B2 | 5/2013 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 9,321,609 B2* | 4/2016 | Koop et al. |
| 2007/0228590 A1* | 10/2007 | LaBossiere ............ B33Y 30/00 264/40.1 |
| 2014/0159273 A1* | 6/2014 | Koop .................... B65H 51/10 264/129 |
| 2015/0096717 A1 | 4/2015 | Batchelder et al. |
| 2015/0097053 A1 | 4/2015 | Batchelder et al. |

\* cited by examiner

FILAMENT LOADING DRIVE IN A 3D PRINTER

BACKGROUND

The present disclosure relates to 3D printers for printing or otherwise producing three-dimensional (3D) parts. In particular, the present disclosure relates to a filament drive for advancing filament from a consumable assembly to a print head feed drive in a 3D printer.

Additive manufacturing, also called 3D printing, is generally a process in which a three-dimensional (3D) object is built by adding material to form a 3D part rather than subtracting material as in traditional machining. One basic operation of an 3D printer consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an 3D printer, commonly referred to as 3D printer.

In a fused deposition modeling 3D printer, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure includes a 3D printer having at least one consumable supply configured to supply filament to a print head and at least one drive assembly for advancing filament to a print head feed drive from the consumable supply. Each drive assembly includes a follower wheel rotatable about a follower axis and a drive wheel spaced apart from the follower wheel. The drive wheel is rotatable about a drive axis and is located on an opposing side of a filament path from the follower wheel such that the follower axis and the drive axis are substantially parallel. The drive wheel further includes an outer surface extending between two ends. The outer surface has at least one engaging portion that is configured to engage with the filament and at least one disengaging portion that is configured to disengage from the filament.

In another aspect of the present disclosure, a 3D printer includes a drive assembly configured to advance filament from a consumable supply to a print head. The drive assembly includes a motor, a drive shaft rotatable about an axis and powered by the motor, a drive wheel fixed to the drive shaft along the axis and configured to provide the filament to the print head. The drive wheel includes an outer surface extending between first and second ends and having at least one engaging portion that is configured to engage with the filament and at least one disengaging portion that is configured to disengage from the filament. The drive assembly further includes a sensor configured to sense when the at least one disengaging portion faces the filament such that the drive wheel is spaced apart from the filament.

In yet another aspect of the present disclosure, a method of loading filament in a 3D printer is provided. A drive wheel is configured to engage with a filament in a first direction to advance the filament to a print head feed drive. The drive wheel includes an outer surface extending between two ends and having at least one engaging portion and at least one disengaging portion. The at least one engaging portion is configured to engage with the filament to drive the filament to the print head feed drive. The drive wheel is configured to disengage from the filament by stopping the drive wheel in a position that corresponds with the at least one disengaging portion facing the filament and thereby causing the drive wheel to be spaced apart from the filament.

Definitions

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DESCRIPTION

Described herein are embodiments of a filament loading drive assembly for advancing filament from a consumable supply to a feed drive at or near a print head in extrusion-based additive manufacturing devices. When the filament advanced from the filament loading drive reaches the feed drive, the loading drive assembly is positioned in a manner that releases its grip on the filament, allowing the feed drive to take over.

In additive manufacturing devices that have multiple filament drives acting on the same filament strand, such as a loading drive at the consumable supply and a feed drive at or near the print head, if one drive runs faster than the other, filament may be pushed into the printer (such as in a feed tube), causing buckling and high friction. Likewise, if one of the drives runs too slow, there may be a high pull force, which causes strain on the motors and results in loss of extrusion. Therefore, it is beneficial if the drive for loading filament into the printer is not in contact with the filament when an additive manufacturing device is building a part. Some drives deal with this issue by using software and making calibrations during manufacture to get the timing correct. Other drives include complex mechanisms for moving the drive away from the filament including extra motors and solenoids, such as is described in U.S. Pat. No. 7,374,712. The drive assembly as described herein simplifies the driving of filament and eliminates the above issues and complexities.

In accordance with this disclosure, the drive assembly for loading filament into a 3D printer includes at least one engaging portion or segment and at least one disengaging portion or segment. In this way, when the engaging portion of the drive wheel is oriented to face the filament and the filament path, the drive wheel engages with the filament and filament is driven to the head. In some embodiments each engaging portion is toothed to increase the traction between the drive and the filament. When the disengaging portion of the drive wheel is oriented to face the filament and the filament path, the drive wheel is disengaged from the filament or otherwise lets the filament pass freely. In some embodiments, each disengaging portion is a planar or flat portion.

Figure 1:
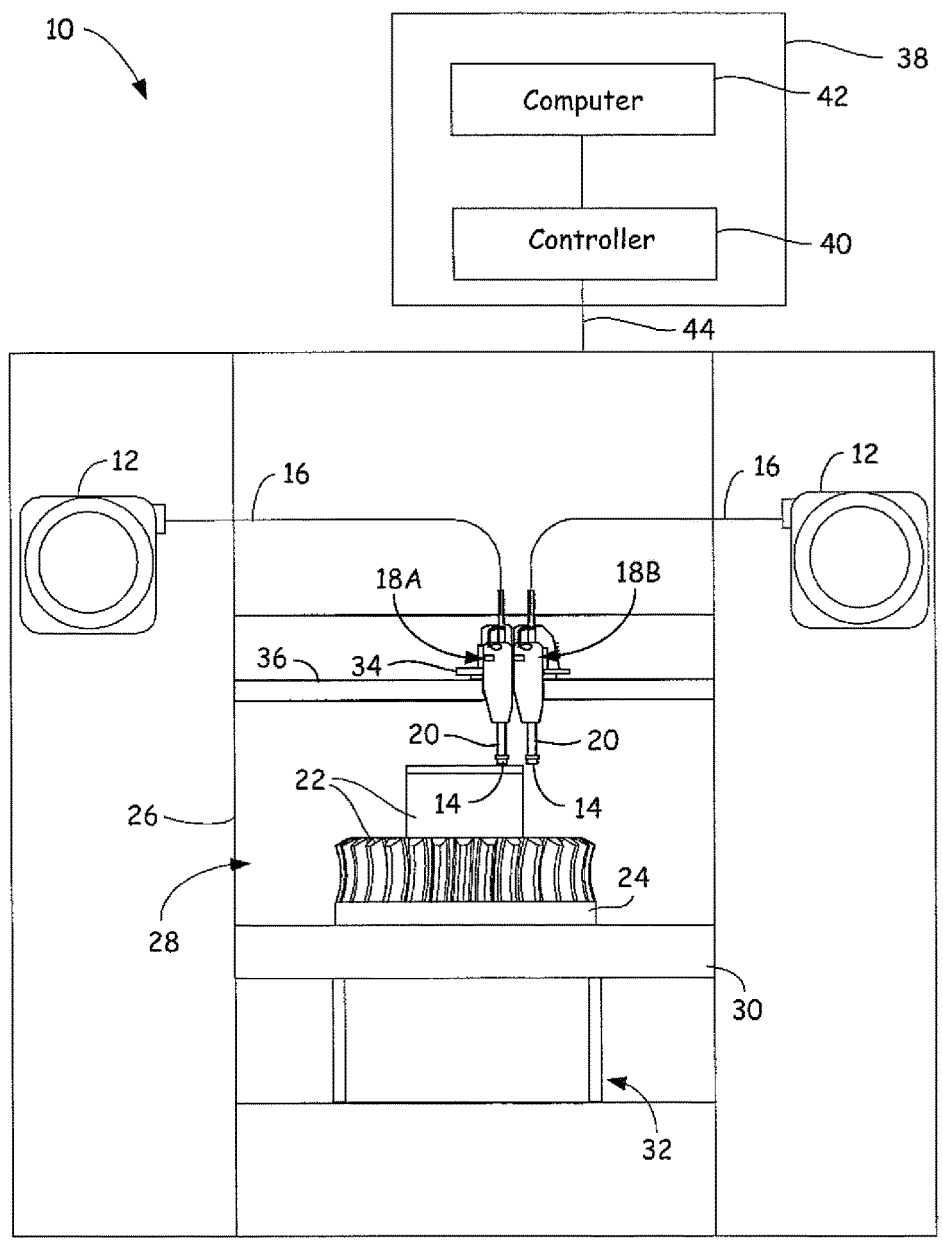
FIG. 1 is a block diagram of a 3D printer configured to print 3D parts and support structures as described in the present disclosure.

The present disclosure may be used with any suitable extrusion-based 3D printer. For example, FIG. 1 illustrates a 3D printer 10 that has a substantially horizontal print plane where the part being printed is indexed in a substantially vertical direction as the part is printed in a layer-by-layer manner using at least one print head. For example, in FIG. 1, 3D printer 10 includes two print heads 18A, 18B and two consumable assemblies 12, where each consumable assembly 12 is an easily loadable, removable, and replaceable container device that retains a supply of a consumable filament for printing with 3D printer 10. Typically, one of the consumable assemblies 12 contains a part material filament, and the other consumable assembly 12 contains a support material filament, each supplying filament to one print head 18A or 18B. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 8,403,658; Turley et al. U.S. Pat. No. 7,063,285; Taatjes at al., U.S. Pat. No. 7,938,356; and Mannella et al., U.S. Pat. Nos. 8,985,497 and 9,073,263.

Each print head 18A and 18B is an easily loadable, removable and replaceable device comprising a housing that retains a liquefier assembly 20 having a nozzle tip 14. Each print head 18A and 18B is configured to receive a consumable material, melt the material in liquefier assembly 20 to produce a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tube 16 provide a path interconnecting consumable assembly 12 and print head 18A or 18B, where a filament feed drive mechanism of print head 18A or 18B (or of printer 10) engages the filament and draws successive segments of the consumable filament from consumable assembly 12, through guide tube 16, to liquefier assembly 20 of print head 18A or 18B. The filament feed drive may be a high-margin drive as described in U.S. Pat. No. 6,004,124, or U.S. Pat. No. 9,321,609, or any type of drive mechanism for engaging and controllably feeding filament into the print head as a part is printed. In this embodiment, guide tube 16 may be a component of 3D printer 10, rather than a sub-component of consumable assemblies 12. In other embodiments, guide tube 16 is a sub-component of consumable assembly 12, and may be interchanged to and from 3D printer 10 with each consumable assembly 12. In alternate embodiments, guide tube 16 may be replaced with another structure or feature that functions to guide a filament strand through the printer. During a build operation, the successive segments of consumable filament that are driven into print head 18A or 18B are heated and melt in liquefier assembly 20. The melted material is extruded through nozzle tip 14 in a layer wise pattern to produce printed parts.

3D printer 10 prints parts or models and corresponding support structures (e.g., 3D part 22 and support structure 24) from the part and support material filaments, respectively, of consumable assemblies 12, using a layer-based, additive manufacturing technique. Suitable 3D printers 10 include fused deposition modeling systems developed by Stratasys, Inc., Eden Prairie, Minn. under the trademark "FDM."

As shown, 3D printer 10 includes system casing 26, chamber 28, platen 30, platen gantry 32, head carriage 34, and head gantry 36. System casing 26 is a structural component of 3D printer 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assembly 12 may stand proximate to system casing 26, while providing sufficient ranges of movement for guide or feed tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18A and 18B, and is supported by head gantry 36. Head carriage 34 preferably retains each print head 18A and 18B in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner). In further embodiments, print heads 18A and 18B and corresponding head carriage 34 may optionally be retrofitted into an existing system 10.

In the shown embodiment, head gantry 36 is a robotic mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18A and 18B) may be configured to move along the z-axis. Other similar arrangements may also be used such that one or both of platen 30 and print heads 18A and 18B are moveable relative to each other. Platen 30 and head carriage 34 (and print heads 18A and 18B) may also be oriented along different axes. For example, platen 30 may be oriented vertically and print heads 18A and 18B may print 3D part 22 and support structure 24 along the x-axis or the y-axis.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18A and 18B, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10. While illustrated as a single signal line, communication line 44 may include one or more electrical, optical, and/or wireless signal lines, which may be external and/or internal to system 10, allowing controller assembly 38 to communicate with various components of system 10.

During operation, controller assembly 38 may direct platen gantry 32 to move platen 30 to a predetermined height within chamber 28. Controller assembly 38 may then direct head gantry 36 to move head carriage 34 (and the retained print heads 18A and 18B) around in the horizontal x-y plane above chamber 28. Controller assembly 38 may also direct the filament feed drives associated with print heads 18A and 18B to selectively draw successive segments of the consumable filaments from consumable assemblies 12 and through guide tubes 16, respectively, to be extruder by print heads 18A and 18B.

While FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1.

Figure 2:
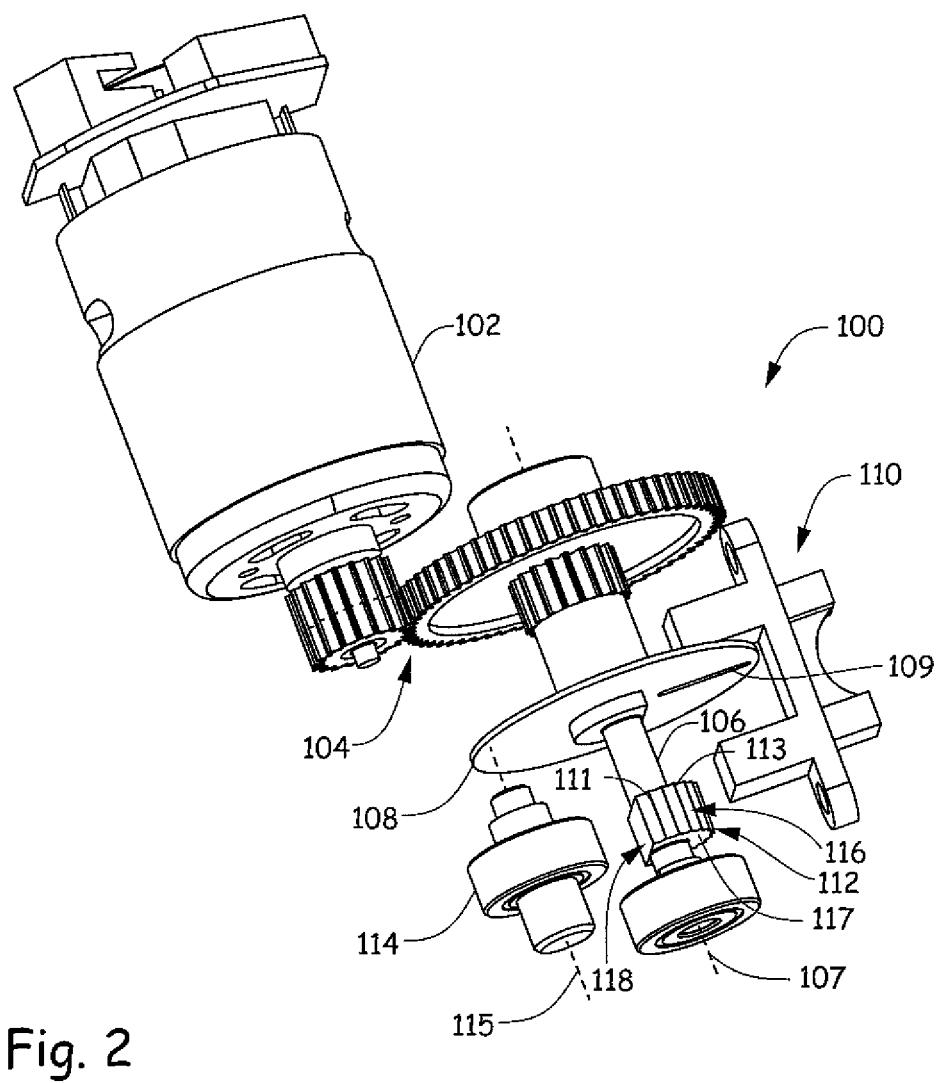
FIG. 2 is a simplified perspective view of a drive assembly for feeding filament to a print head in a 3D printer according to one embodiment.
Figure 3:
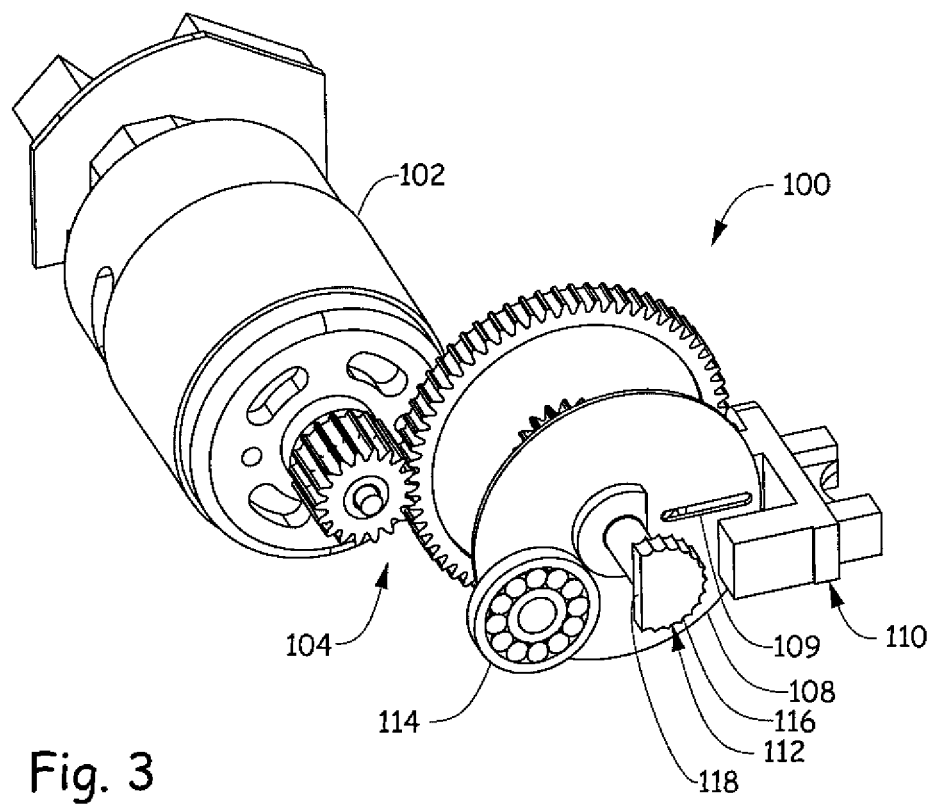
FIG. 3 is a more detailed section view of a drive assembly for feeding filament to a print head in a 3D printer according to one embodiment.

FIG. 2 is a simplified perspective view of a drive assembly 100 for loading filament from consumable supply 12 to print head 18A or 18B in 3D printer 10 according to one embodiment. FIG. 3 is a more detailed section view of drive assembly 100 for loading filament from consumable supply 12 to print head 18A and 18B in 3D printer 10 according to one embodiment. Drive assembly 100 includes a motor 102, gear train 104, a rotatable drive shaft 106 located along a drive axis 107 and powered by motor 102, an encoder wheel 108 fixed to drive shaft 106, an optical sensor 110, a drive wheel 112 fixed to shaft 106 and a follower wheel 114 located separately from shaft 106 along a follower axis 115. Follower wheel 114 is rotatable about follower axis 115 and follower wheel 114 is spaced apart from drive wheel 112. In particular, drive wheel 112 is located on an opposing side of a filament path such that drive axis 107 and follower axis 115 are substantially parallel.

As illustrated in FIGS. 2 and 3, drive wheel 112 comprises an outer surface 111 that extends between a first end 113 and a second end 117. In other words, drive wheel 112 is similar, but different to the basic shape of a cylinder where a cylinder has a first circular end, a second circular end and an outer arcuate surface therebetween. Like a cylinder, drive wheel 112 includes at least one engaging portion or arcuate portion 116 that may include a plurality of teeth on outer surface 111. Unlike a cylinder, drive wheel 112 includes at least one disengaging portion or planar or flat portion 118. Although drive wheel 112 includes the at least one disengaging portion 118, drive wheel 112, when continuously rotated is capable of driving the filament using the at least one engaging portion 116.

In the embodiment illustrated in FIGS. 2 and 3, drive wheel 112 includes only one engaging or arcuate portion 116 and, in particular, engaging portion 116 follows an outer curved surface of a cylinder. In the embodiment illustrated in FIGS. 2 and 3, drive wheel 112 includes only one disengaging or flat portion 118, which is a slice made through the cylindrical shape. The slice is made substantially parallel with drive axis 107 and therefore off-center from drive axis 107 thus giving drive wheel 112 a D-shape, where the arcuate portion 116 of the D is optionally toothed and the straight portion of the D is the planar or flat portion 118. In other words, each disengaging portion 116 of outer surface 111 of drive wheel 112 is located a same radial distance from drive axis 107 and wherein each disengaging portion 118 is located a varying distance from drive axis 107.

However, it should be realized that other embodiments with respect to shape are possible. For example, drive wheel 112 can be of an extruded triangle shape, where each corner of the triangle is an engaging portion with optional teeth and each leg of the triangle is a disengaging portion that is flat or planar. In this case, the drive wheel would include three engaging portions and three disengaging portions. In another example, drive wheel 112 can be of an extruded polygon, such as an extruded hexagon or an extruded octagon shape, where each corner of the polygon is an engaging portion optionally having teeth and each leg of the extruded polygon is a disengaging portion that is flat or planar. In this case, the drive wheel 112 would include six engaging portions and six disengaging portions for an extruded hexagon shape and eight engaging portions and eight disengaging portions for an extruded octagon shape.

Figure 4:
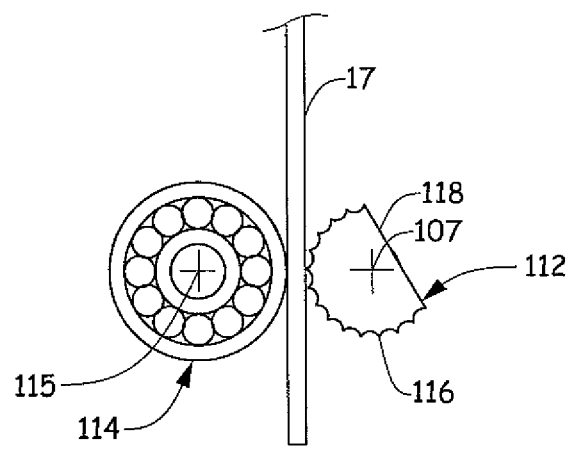
FIG. 4 is a schematic diagram illustrating the drive assembly illustrated in FIGS. 2 and 3 in an engaged position with a filament.
Figure 5:
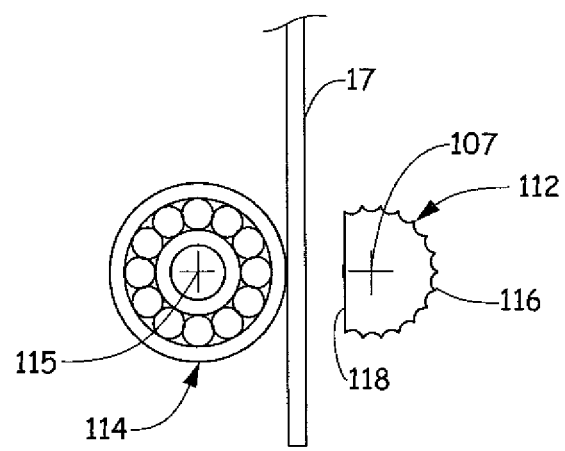
FIG. 5 is a schematic diagram illustrating the drive assembly illustrated in FIGS. 2 and 3 in a disengaged position with a filament.

FIG. 4 is a schematic diagram illustrating drive wheel 112 in an engaged position with a filament. FIG. 5 is a schematic diagram illustrating drive wheel 112 in a disengaged position with a filament. Both FIGS. 2 and 3 illustrates drive wheel 112 in a disengaged position. During operation, motor 102 provides the power to rotate drive shaft 106 via gear train 104, which then rotates drive wheel 112 to drive a filament up to a print head. In particular, engaging portion 116 of drive wheel 112 grabs or engages filament against follower wheel 114 and uses follower wheeler 114, which opposes drive wheel 112, to create a frictional engagement to ensure the filament is advanced at a desirable rate with substantially no slippage.

In FIG. 4, engaging portion 116 of drive wheel 112 is engaged with filament 17 and therefore drives filament to a print head through rotation of the drive wheel 112 in a first rotational direction. In FIGS. 2, 3 and 5, drive wheel 112 is disengaged from filament 17 and therefore is not driving the filament to print head. Therefore, when motor 102 continuously rotates drive wheel 112, drive wheel 112 is not continuously being engaged with the filament during driving, but the resulting drive of filament, because of the speed and torque at which drive wheel 112 is moving and the fact that the filament is not engaged with the print head drive, does not adversely affect the feed of filament to the print head.

However, when the filament reaches the print head and the filament is engaged by a filament feed drive mechanism at the print head, then motor 112 is turned off by a controller, such as controller assembly 38, which stops drive wheel 112 from rotating. When stopped, drive wheel 112 needs to be oriented in a position where it is disengaged from the filament. This means the controller orients drive wheel 112 so that planar or flat portion 118 faces filament 17. To accomplish this, drive assembly 112 includes sensor 110, which in the illustrated embodiment is an optical sensor 110. Sensor 110 senses when at least one planar or flap portion 118 faces the filament and drive wheel 112, sends this information to the controller and the controller moves drive wheel 112 so that flat or planar portion 118 faces filament 17 and therefore disengages from the filament 17.

In the embodiment illustrated, encoder wheel 108, which is fixed to shaft 106 and spaced apart from drive wheel 112, includes a slot 109. Slot 109 extends along a portion of a radius of encoder wheel 108 and is positioned or located on encoder wheel 108 substantially perpendicular to planar or flat portion 118 and opposite from flat portion 118 with respect to drive shaft 106 and drive axis 107. More specifically, optical sensor 110 senses slot 109 as being in a position that denotes that the at least one planar or flat portion 118 of drive wheel 112 is disengaged from the filament. Drive assembly 100 uses the sensed information from optical sensor 110 to orient drive wheel 112 in this position.

In some instances, it is desirable to retract the filament 17 from the print head 18A or 18B such as when the filament in the consumable assembly 12 is depleted. To retract the filament 17 from the print head 18A or 18B, the drive wheel 112 is moved in a second rotational direction, opposite the first rotational direction. Once the filament 17 is retracted from the print head 18A or 18B, the consumable assembly 12 can be removed and/or replaced. Alternatively, the drive wheel 112 is moved in the second rotational direction until the filament 17 is retracted into or near the consumable assembly 12.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A 3D printer comprising:
   a drive assembly configured to advance filament from a consumable loading bay to a print head, the drive assembly comprising:
      a motor;
      a drive shaft rotatable about a fixed axis and being powered by the motor;
      a drive wheel comprises a shape of a letter D and having an engaging portion and a disengaging portion, wherein the engaging portion of the drive wheel comprises an arcuate portion of the shape of the letter D wherein the arcuate portion comprises a plurality of teeth and wherein the disengaging portion of the drive wheel comprises a straight portion of the shape of the letter D wherein the disengaging portion is substantially flat, wherein the drive wheel is fixed to the drive shaft and rotatable about the fixed axis of the drive shaft and configured to feed the filament to the print head, wherein the engaging portion is configured to engage with the filament as the drive wheel is rotated and the disengaging portion is configured to disengage from the filament as the drive wheel is rotated; and a sensor configured to sense when the at least one disengaging portion faces the filament such that the drive wheel is spaced apart from the filament.

2. The 3D printer of claim 1, wherein the sensor comprises an encoder wheel fixed to the drive shaft along the axis and spaced apart from the drive wheel.

3. The 3D printer of claim 2, wherein the sensor further comprises an optical sensor that senses a position of the encoder wheel that is indicative of the at least one disengaging portion facing the filament and therefore the drive wheel as being spaced apart from the filament.

4. The 3D printer of claim 2, wherein the encoder wheel comprises a slot that is located substantially perpendicular to the at least one disengaging portion of the drive wheel and on an opposing side of the drive shaft from the at least one disengaging portion of the drive wheel.

5. The 3D printer of claim 4, wherein the sensor comprises an optical sensor that senses the position of the slot in the encoder wheel to determine the position of the at least one disengaging portion of the drive wheel.

6. The 3D printer of claim 1, further comprising a controller configured to stop the drive assembly in a position where the at least one disengaging portion faces the filament and thereby is spaced apart from the filament when the filament reaches the print head.

7. A method of loading filament into a 3D printer, the method comprising:

engaging a drive wheel with a filament in a first direction to advance the filament to a print head feed drive by rotating the drive wheel about a fixed axis, the drive wheel including an outer surface comprising a shape of a letter D and having an engaging portion and a disengaging portion, wherein the engaging portion of the drive wheel comprises an arcuate portion of the shape of the letter D wherein the arcuate portion comprises a plurality of teeth and wherein the disengaging portion of the drive wheel comprises a straight portion of the shape of the letter D wherein the disengaging portion is substantially flat, wherein the engaging portion engages with the filament as the drive wheel is rotated about the fixed axis to drive the filament to the print head feed drive and wherein the disengaging portion disengages from the filament as the drive wheel is rotated about the fixed axis; and disengaging the drive wheel from the filament when the filament reaches the print head feed drive by stopping the drive wheel in a position that corresponds with the at least one disengaging portion facing the filament and thereby causing the drive wheel to be spaced apart from the filament.

8. The method of claim 7, wherein disengaging the drive wheel from the filament by stopping the drive wheel in the position that corresponds with the at least one disengaging portion facing the filament comprises sensing that the at least one disengaging portion of the drive wheel is in a position that faces the filament.

9. The method of claim 8, wherein sensing the at least one disengaging portion of the drive wheel is in the position that faces the filament comprises sensing with an optical sensor an encoder wheel that includes a slot in a position that is known relative to the at least one disengaging portion.

10. The method of claim 7, and further comprising engaging the drive wheel with the filament in a second direction to retract the filament from the print head feed drive.

11. The 3D printer of claim 1 and further comprising:
a follower wheel rotatable about a fixed follower axis wherein the follower wheel is spaced from the drive wheel such that the follower wheel and the engaging portion of the drive wheel counter-rotate and engage opposing sides of the filament to drive the filament.

12. A 3D printer comprising:
a drive assembly configured to advance filament from a consumable loading bay to a print head, the drive assembly comprising:
a motor;
a drive shaft rotatable about a fixed axis and being powered by the motor;
a drive wheel fixed to the drive shaft and rotatable about the fixed axis and configured to feed the filament to the print head, wherein the drive wheel includes an outer surface extending between first and second ends and having an engaging portion configured to engage with the filament as the drive wheel is rotated and a disengaging portion configured to disengage from the filament as the drive wheel is rotated; and
a sensor configured to sense when the disengaging portion faces the filament such that the drive wheel is spaced apart from the filament;
wherein the drive wheel comprises a shape of a letter D, wherein the engaging portion comprises an arcuate portion of the D and has a plurality of teeth and the disengaging portion comprises a straight, flat portion of the letter D.

* * * * *